United States Patent [19]

Morris et al.

[11] Patent Number: 5,038,392
[45] Date of Patent: Aug. 6, 1991

[54] METHOD AND APPARATUS FOR ADAPTIVE IMAGE PROCESSING BY RECOGNIZING A CHARACTERIZING INDICIUM IN A CAPTURED IMAGE OF A DOCUMENT

[75] Inventors: James K. Morris, Arlington; Robert E. Probst, Reston, both of Va.; Robert A. Utley, Randallstown, Md.

[73] Assignee: International Business Machines Corporation, Armonk, N.Y.

[21] Appl. No.: 478,325

[22] Filed: Feb. 12, 1990

[51] Int. Cl.$^5$ ............................................. G06K 9/20
[52] U.S. Cl. ................................................... 382/61
[58] Field of Search .................................. 382/61, 56

[56] References Cited

U.S. PATENT DOCUMENTS 4,933,984  6/1990  Nakano et al. .................. 382/61
4,949,392  8/1990  Barski et al. .................... 382/61

*Primary Examiner*—Stephen Brinich
*Attorney, Agent, or Firm*—John E. Hoel

[57] ABSTRACT

In a system for capturing an image of a document having a characterizing indicium associated therewith, the invention includes the step of storing in the system a plurality of document templates. Each document template defines locations of a first type and second type information blocks on a corresponding one of a plurality of document types. The document templates are accessible by an indicium value. The invention further includes storing in the system a table relating the first type information block to first type processing parameters and a second type information block to second type processing parameters. The invention further includes the step of capturing an image of the document and storing the image in an image buffer. Then, a characterizing indicium associated with the document is recognized by the system. Thereafter, one of the plurality of document templates is accessed in response to a value of the recognized characterizing indicium associated with the document. Then, a first type block of information is selectively accessed from the image of the document in the image buffer, at a location defined by the document template. Thereafter, first type processing parameters are selectively accessed from the table corresponding to the first type information block. Using the first type processing parameters so accessed, the information from the first type block is processed. This adaptive processing can include a selected image compression algorithm suited to the particular type of image in the data block. The adaptive processing can further include the preparation of an output image data object file which is routed to a recipient or to a work flow in response to the particular document type represented by the indicium associated with a document. In this manner, the image of the document can be adaptively processed by the system.

26 Claims, 7 Drawing Sheets

| DOCUMENT TYPE ID | TEMPLATE 48 | | |
|---|---|---|---|
| | BLOCK NUMBER | INFORMATION TYPE | LOCATION |
| TYPE A | BLOCK 1 | PICTORIAL | (x3, y3) ; (x3, y4); (x4, y3) ; (x4, y4) |
| | BLOCK 2 | TEXT | (x5, y5) ; (x5, y6) ; (x6, y5) ; (x6, y6) |
| TYPE B | BLOCK 1' | PICTORIAL | (x9, y9) ; (x9, y10) ; (10, y9) ; (x10, y10) |
| | BLOCK 2' | TEXT | (x7, y7) ; (x7, y8) ; (x8, y7) ; (x8, y8) |

FIG. 3b

| INFORMATION TYPE | PROCESSING PARAMETERS 50 | | |
|---|---|---|---|
| | THRESHOLD DISCRIM. | DIGITAL FILTRT | COMPRESSION |
| PICTORIAL | $T_1$ | $D_1$ | $C_1$ |
| TEXT | $T_2$ | $D_2$ | $C_2$ |

METHOD AND APPARATUS FOR ADAPTIVE IMAGE PROCESSING BY RECOGNIZING A CHARACTERIZING INDICIUM IN A CAPTURED IMAGE OF A DOCUMENT

BACKGROUND OF THE INVENTION

1. Technical Field

The invention disclosed broadly relates to data processing systems and more particularly relates to improvements in the storage manipulation and retrieval of digitized images.

2. Background Art

A digitized image requires a large amount of storage, e.g., a simple binary coded 8½×11 typewritten page requires 3.74 million bits of storage when scanned at 200 lines per inch in both dimensions. In the usual terminology of computer storage, this is 467.5 kilo bytes. This compares with approximately 3 kilo bytes of character data that is required to store a typical typewritten page of text.

To reduce the storage and transmission requirements in holding and moving these pictures through a system, encoding is usually applied. Coders in which the data is reduced while allowing a perfect reproduction of the information are referred to as information preserving encoders.

Compression in the spatial domain usually is a run length type of encoding which maps the sequence of picture elements; $a(1), a(2), a(3) \ldots$ into a sequence of pairs $(c(1),1(2))$, where c denotes the color, black or white for binary, and 1 represents the length of the sequence. The number of bits required to store 1, obviously has to be greater than 1 for this method to be useful. Suppose, for example that we reserve two bits, using standard binary counting to describe run lengths, that is we can describe lengths up to four bits. Then, it is required to have three bits of storage, per run length transition. For example, the sequence 1111000110011001 that requires 16 bits, would be represented by the following pairs (1,11),(0,10),(1,01),(0,01),(1,01),(0,01),(1,00); 111010101001101001100. As can be seen from the example, if there are a large number of transitions, the approach does not compress the data, but rather expands the data. Of course, in well-behaved sequences, the compression significantly reduces the data, e.g., 1111111111110000 reduces to (1,11),(1,11),(1,11),(0,11) or 111111111011. The problem, as illustrated, indicates that compression may not reduce data if there are a large number of transitions, but may in fact expand the data. The problem is acute in valuable documents, e.g., checks, stock certificates, and negotiable instruments of all types. These documents are designed to make it difficult to copy, or reproduce for the obvious reason of decreasing the probability of fraud.

The ability to decrease the storage and data transmission requirements for images of complex documents is the subject of this patent application. While negotiable instruments are the examples used, the concept is not limited to these types of documents.

In some applications it is not necessary to have information preserving encoders. In these applications it is only necessary to have a "good enough" picture or image to obtain the relevant information. In these situations, the source documents may be kept in a remote low cost storage facility, in case of legal issues, or the document may be required as a reference for some period of time but is not critical enough to require perfect reproduction. A personal check for a small amount is an example. The bank may want a readable image in its archives for two or three billing cycles, but safekeeping is the responsibility of the person who wrote the check and reference to a readable picture in the archive is sufficient to resolve any minor balancing concerns.

This invention addresses processing of these documents when preserving all the information is not necessary. The invention addresses large volume efforts where it is desirable to process documents without operator intervention and it is necessary to adjust the processing automatically as a function of a key characteristic of the document or control card.

Various characteristics of the document can be used, including, but not limited to: color, mark sense characters, MICR, OCR, bar code and text recognition.

OBJECTS OF THE INVENTION

It is therefore an object of the invention to adaptively process digitized images, in an improved manner.

It is a further object of the invention to adaptively compress document images based upon an a priori information about the document, in an improved manner.

It is yet a further object of the invention to adaptively capture the image of documents based upon an a priori knowledge of the document, in an improved manner.

It is still a further object of the invention to adaptively capture the image on one or two sides of a document, based upon an a priori knowledge of the document, in an improved manner.

It is still a further object of the invention to adaptively sort or route a document after document image capture, based upon an a priori knowledge of the document, in an improved manner.

It is still a further object of the invention to adaptively route an object data image of a document which has been captured, based upon an a priori knowledge of the document, in an improved manner.

SUMMARY OF THE INVENTION

These and other objects, features and advantages are accomplished by the method and apparatus for adaptive image processing, disclosed herein. In a system for capturing an image of a document having a characterizing indicium associated therewith, the invention includes the step of storing in the system a plurality of document templates. Each document template defines locations of a first type and second type information blocks on a corresponding one of a plurality of document types. The document templates are accessible by an indicium value. The invention further includes storing in the system a table relating the first type information block to first type processing parameters and a second type information block to second type processing parameters.

The invention further includes the step of capturing an image of the document and storing the image in an image buffer. Then, a characterizing indicium associated with the document is recognized by the system. Thereafter, one of the plurality of document templates is accessed in response to a value of the recognized characterizing indicium associated with the document. Then, a first type block of information is selectively accessed from the image of the document in the image buffer, at a location defined by the document template. Thereafter, first type processing parameters are selectively accessed from the table corresponding to the first type information block.

Using the first type processing parameters so accessed, the information from the first type block is processed. This adaptive processing can include a selected image compression algorithm suited to the particular type of image in the data block. The adaptive processing can further include the preparation of an output image data object file which is routed to a recipient or to a work flow in response to the particular document type represented by the indicium associated with a document. In this manner, the image of the document can be adaptively processed by the system.

BRIEF DESCRIPTION OF THE DRAWINGS

These and other objects, features and advantages of the invention will be more fully appreciated with reference to the accompanying figures.

FIG. 2a is a depiction of a type A document and FIG. 2b a type B document, both of which have a text data block and a pictorial data block arranged in different relative locations on the document, and each of which is characterized by different indicium.

FIG. 6a is a diagram depicting the front and FIG. 6b the back sides of a stock certificate, illustrating non-informational portions 102, text portions 104 and signature portions 108, each representing blocks of images which must be treated differently in image compression steps.

DESCRIPTION OF THE BEST MODE FOR CARRYING OUT THE INVENTION

Figure 1:
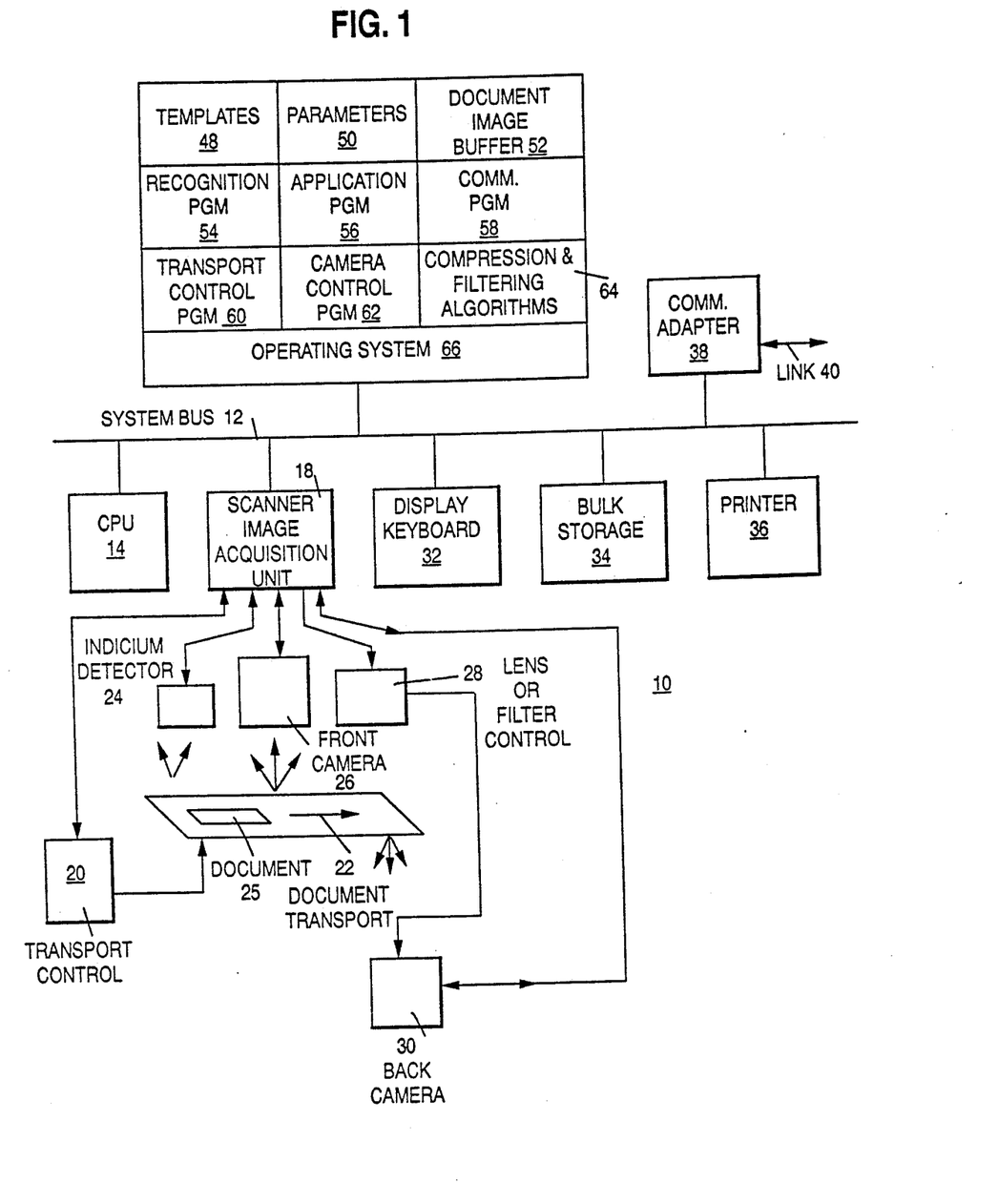
FIG. 1 is an overall system block diagram of a workstation which can perform adaptive image processing, in accordance with the invention.

FIG. 1 illustrates a system block diagram of a workstation in which adaptive image processing can be carried out in accordance with the invention. The system 10 of FIG. 1 includes a system bus 12 which interconnects CPU 14 with the random access memory 16. A scanner image acquisition unit 18 acts as an interface between the system bus 12 and several document transport components including the transport control 20, the document transport 22, the indicium detector 24, the front camera 26, the lens or filter control 28, and the back camera 30. The system 10 of FIG. 1 further includes a display/keyboard 32 connected to the system bus 12, a bulk storage 34 and a printer 36 also connected to the system bus 12. In order to communicate control and data between the workstation shown in FIG. 1 and a host system or other workstations, the communications adapter 38 connected to the system bus 12 will handle communications over the communications link 40.

Figure 2A:
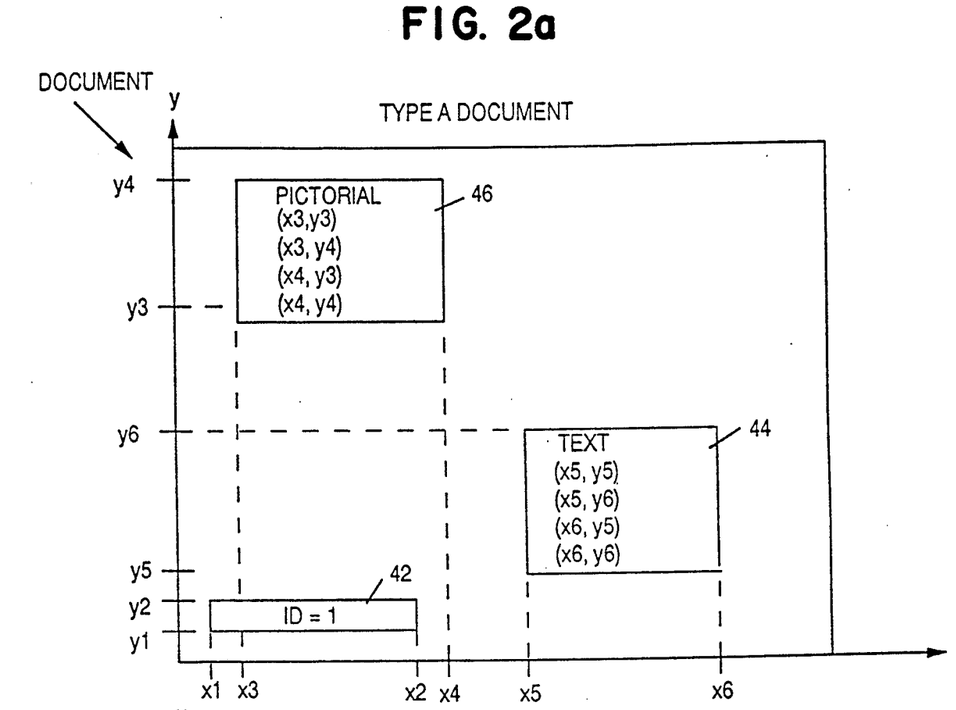
Figure 3A:
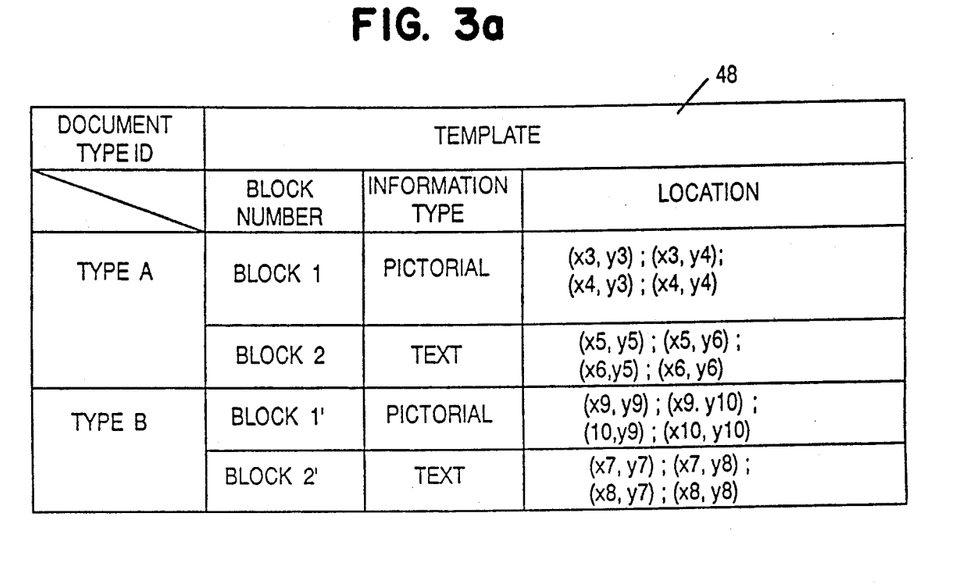
FIG. 3a is a layout of a document template for a type A document and a type B document and FIG. 3b depicts a table for the processing parameters associated with different types of images, in particular pictorial and text images.
Figure 3B:
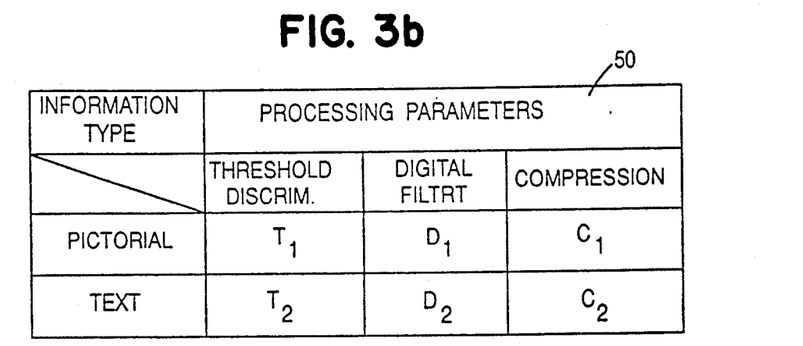

The memory 16 stores document templates 48, such as is shown in FIG. 3a and a processing parameter table 50 such as is also depicted in FIG. 3b. The document image buffer 52 will store the captured image of a document such as the type A document shown in FIG. 2a. The recognition program 54 can be a conventional program to convert a two-dimensional pixel image of a document containing alphanumeric text, to an alphanumeric character string. The application program 56 will include, among other things, this code for executing the sequence of operational steps depicted in FIG. 4 and also the sequence of operational steps depicted in the flow diagram of FIG. 7. The communications program 58 will handle data communications through the communications adapter 38 over the link 40. The transport control program 60 will handle operations by the transport control 20 controlling the document transport 22. The camera control program 62 will control the front camera 26, the back camera 30, and the lens or filter control 28. The compression and filtering algorithms 64 are selectively designated by the parameter table 50 in accordance with a particular image type and document type being processed on the document transport 22, and consists of various selected standard data compression and filtering algorithms. The operating system 66 provides the overall operational control for the CPU 14 and the various I/0 components connected to the system bus 12.

Figure 2B:
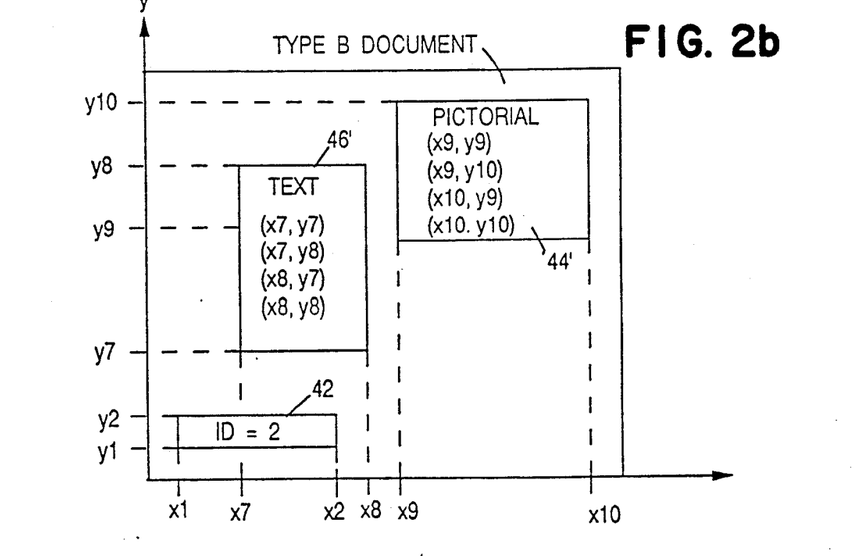

FIGS. 2a and 2b illustrate two different document types, a type A document and a type B document, to illustrate the operation of the invention. In a type A document as shown in FIG. 2a, the document has an indicium ID=1 in field 42. All documents having the type A document layout, will have the indicium ID=1 and will have the arrangement of text information 44 and pictorial information 46 as shown in FIG. 2a. The coordinates for the text portion 44 and the coordinates for the location of the pictorial portion 46 can be stored in a document template 48, such as is shown in FIG. 3a. FIG. 3a shows the document template 48 for a type A document and a type B document. As can be seen, block 1 which is the pictorial block 46, has its position coordinates stored in the template 48 and block 2 which is the text block 44 for document type A, has its position coordinates also stored in the template 48. In a similar manner, other type documents such as the type B document shown in FIG. 2b, having a different layout and a correspondingly different indicium ID=2, will have its various informational blocks 44' and 46' characterized in the document template 48 of FIG. 3a. In accordance with the invention, the system shown in FIG. 1 will read the indicium 42 for a particular document and characterize this document type and will then access the corresponding template 48 as being a type A document or a type B document, as indicated by the indicium. The system will then access processing parameters in Table 2 of FIG. 3b, corresponding to the particular type of information being either a pictorial or text information, and will perform appropriate processing on the information in response to the value of the processing parameters so accessed from the processing parameter table 50.

Figure 4:
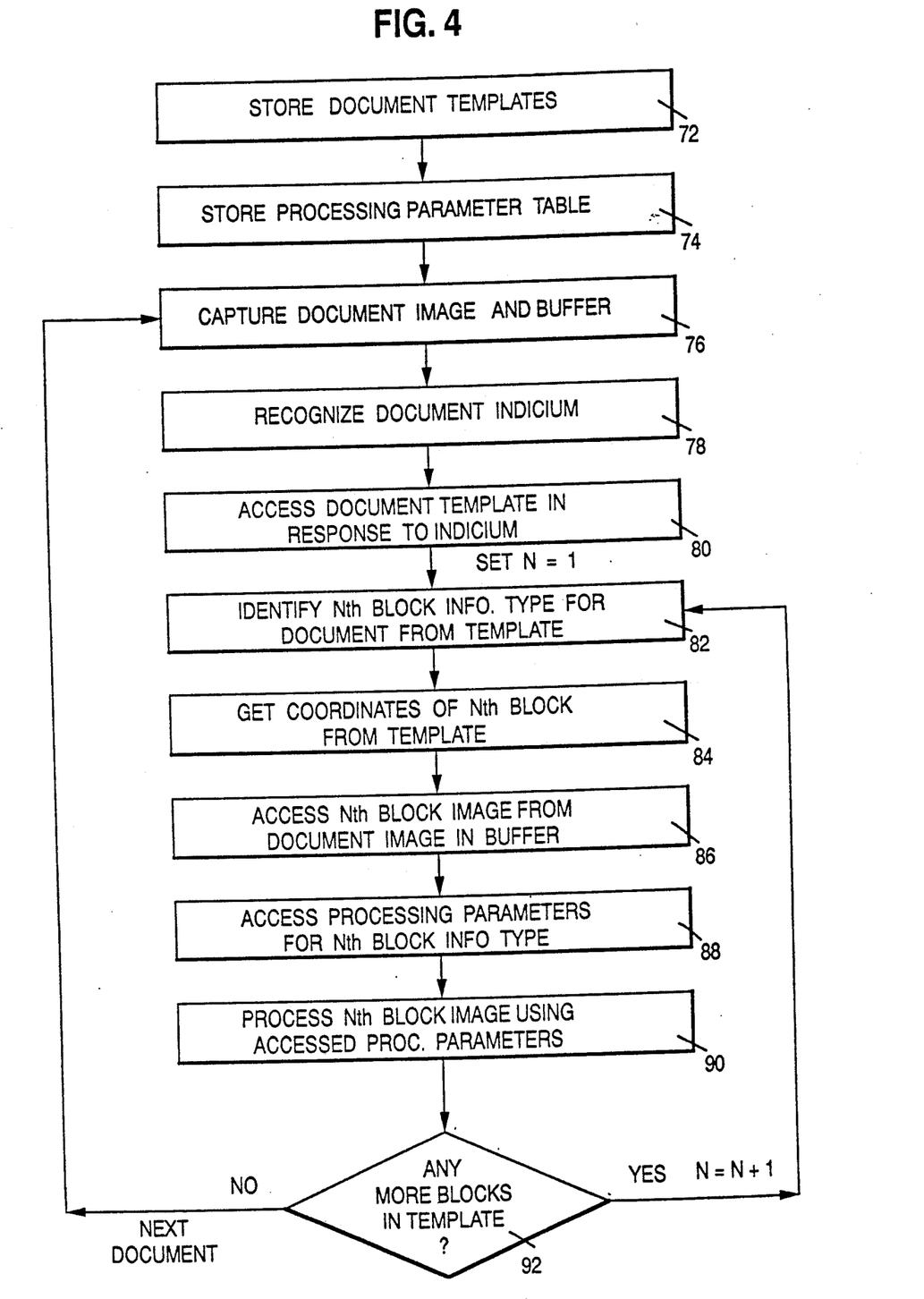
FIG. 4 is a flow diagram of a sequence of operational steps for carrying out a first embodiment of the invention.

This operation can be better seen with reference to the flow diagram of FIG. 4. The sequence of operational steps for carrying out the process of adaptively processing images in the system of FIG. 1, is shown in FIG. 4. At initial program load stage for the system of FIG. 1, document templates 48 can be stored in the memory 16, as is shown in step 72. Processing parameter tables 50 can be stored in the memory 16 of FIG. 1, as is shown in step 74.

At this point, the document processing stage of the method of FIG. 4 commences. In step 76, a document 25 will pass down the document transport 22 and its image will be captured by the front camera 26 and optionally the back camera 30, and those digitized images will then be stored in the memory 16 in the document image buffer 52. The scanner/image acquisition unit 18, under control of the CPU 14, will control the cameras 26 and 30 and will exercise additional control as necessary, for the transport control 20 and the lens or filter control 28.

The next step in the flow diagram of FIG. 4 is the recognition of the document indicium in step 78, which is carried out by the indicium detector 24 in FIG. 1. Alternately, the image of the document captured by the camera 26 or the camera 30, which is stored in the document image buffer 52, can be subjected to a soft character recognition routine by the recognition program 54, in order to identify and evaluate the indicium 42 on the document.

The next step in the flow diagram of FIG. 4 is to access the document template in step 80, in response to the value of the indicium 42. The document templates 48 shown in FIG. 3a are accessed by the value of the indicium 42 which is read from the document or at least is associated with the document. Assume, for example, that the document indicium indicates a type A document. The type A document template will be accessed from the template storage 48 of the memory 16 in order to identify the type and location of the various information blocks in the document. For a type A document, as can be seen in FIG. 2a, there is a text portion 44 and a pictorial portion 46. The location of the pictorial portion is indicated in the template and the location of the text portion is also indicated in the template.

The flow diagram of FIG. 4 then progresses to step 82 wherein a first block information type is identified for the document from the template 48. In this case, block type 1 is pictorial block 46 whose location is designated by the coordinates specified in the template. Step 84 of the flow diagram of FIG. 4 gets the coordinates of the first block from the template.

Step 86 of the flow diagram of FIG. 4 then accesses the first block image which is the image portion 46 stored in the document image buffer 52. The image portion 46 which is the pictorial portion will then be subjected to processing as follows.

Step 88 of the flow diagram of FIG. 4 accesses the processing parameters for the pictorial type data block 46, as is specified in the processing parameters table 50 of FIG. 3b. The processing parameters are accessed from the memory 16 and can, for example, designate the type of image compression algorithm which is to be applied to the pictorial data in the block 46.

The flow diagram of FIG. 4 then passes to step 90 which processes the first block of pictorial data 46 using the accessed process parameters for the selected compression algorithm. The selected compression code is then accessed from partition 64 of the memory 16 and the CPU 14 will then execute the compression algorithm to compress the pictorial data in block 46, thereby producing an optimized compressed rendering of the pictorial block 46.

Figure 8:
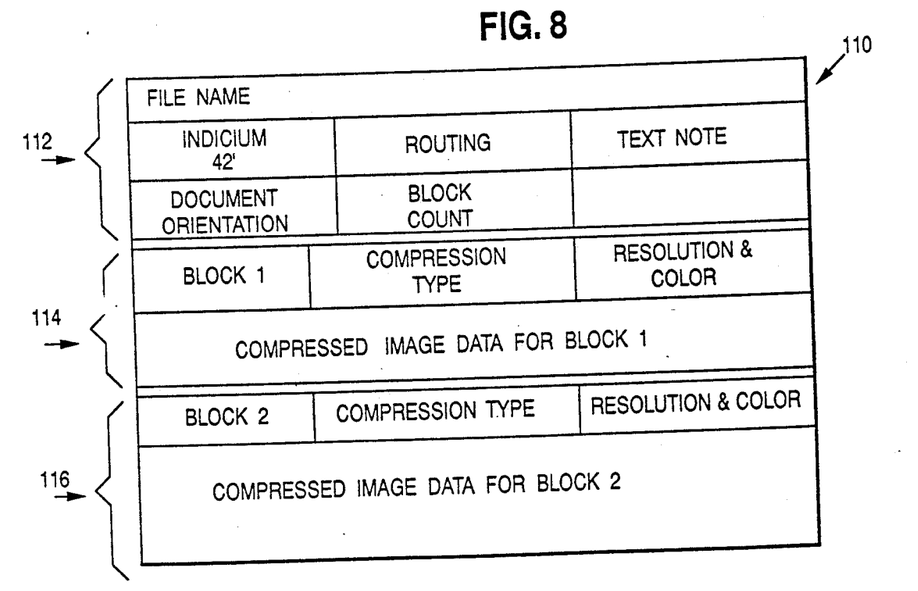
FIG. 8 depicts an example format for the document image object data file which results from the image capture and data compression of two data blocks from a document.

The compressed image object data for the pictorial block 46 can then be assembled into a document image object data file as is illustrated in FIG. 8. The document image object data file will have a header 112 for the file which will include the file name, and can also include the indicium value 42', and other file characteristics such as routing information, a text note, document orientation, block count for the file, and other file information. The block count will correspond to the number of different image blocks which are appended to the file 110. In this case for the pictorial image block 46, the image object data portion 114 will store the compressed image data for block 1 which is the pictorial block 46. Also included in the portion 114 will be the identity of block 1, the compression algorithm type selected for the compression, the image resolution and other optional parameters such as the original color of the image. All of this information is then assembled into the section 114 of the document image object data file 110.

If the indicium which was read in step 78 of the flow diagram of FIG. 4 was ID=2 in the field 42 of the document, this would have characterized the document as a type B document and therefore the type B document template would have been accessed and its corresponding designated processing parameters would have been applied for the compression of the pictorial information in block 44' and the text information in the block 46'.

Figure 7:
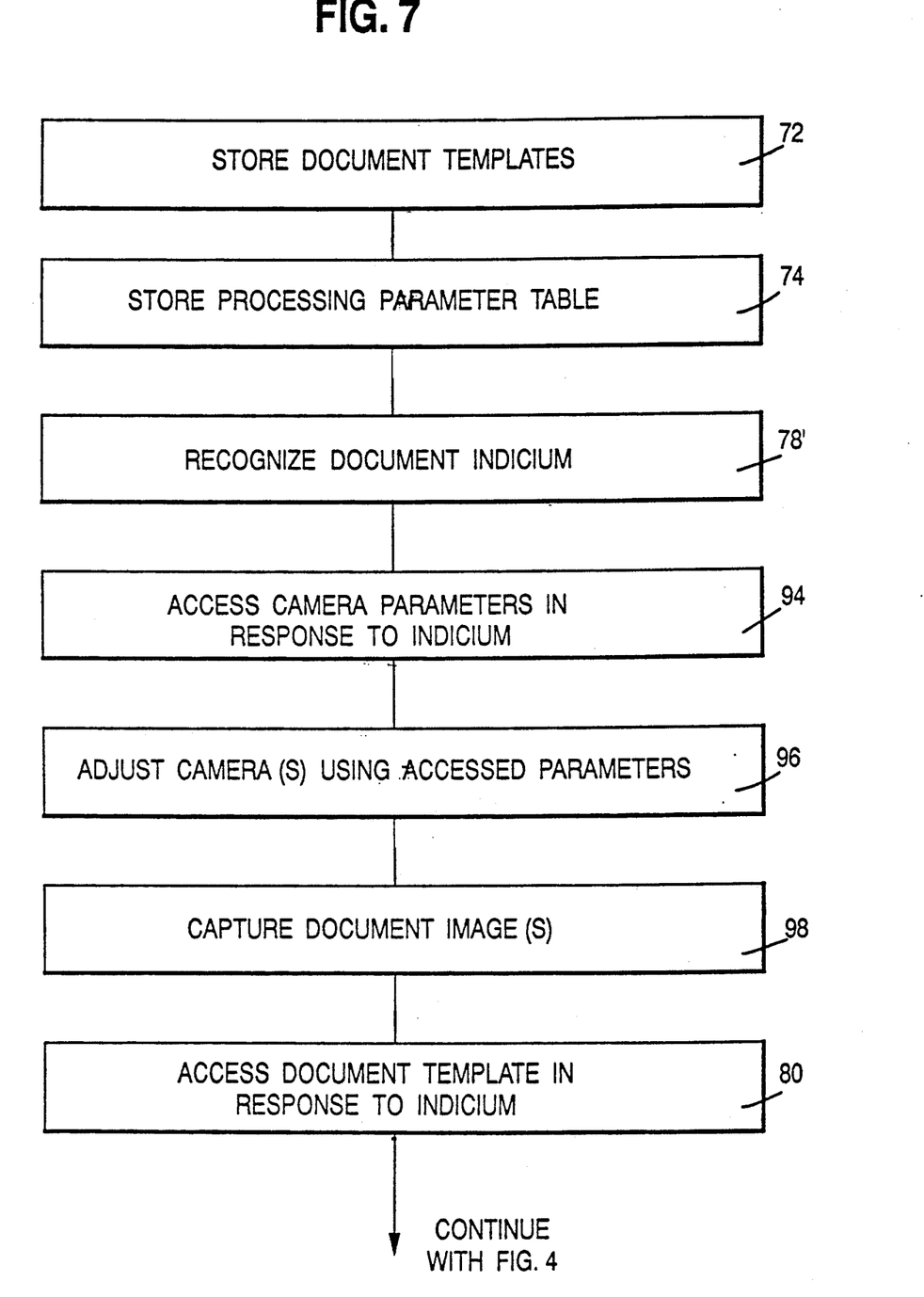
FIG. 7 is a portion of a flow diagram of a sequence of operational steps for an alternate embodiment of the invention.

In an alternate embodiment of the invention shown in Fig. 7, the document indicium 42 will be recognized in step 78' prior to the document image capture step 98, in order to enable the document indicium to specify initial camera parameters for the document image capture. This is shown in step 94 of the flow diagram of FIG. 7, wherein camera parameters which also may be stored in the parameter storage partition 50 of the memory 16, will be accessed in response to the value of the indicium which was read in step 78'. Thereafter, the front camera 26 and optionally the back camera 30 can be adjusted by means of the lens or filter control 28 in order to move a different lens or different filter in front of the camera in response to a particular color or other characteristic of the document type being scanned. The scanner/image acquisition unit 18 acts as an interface between the CPU 14 and the lens or filter control 28 to carry out the control of the front camera 26 and the back camera 30.

Figure 5:
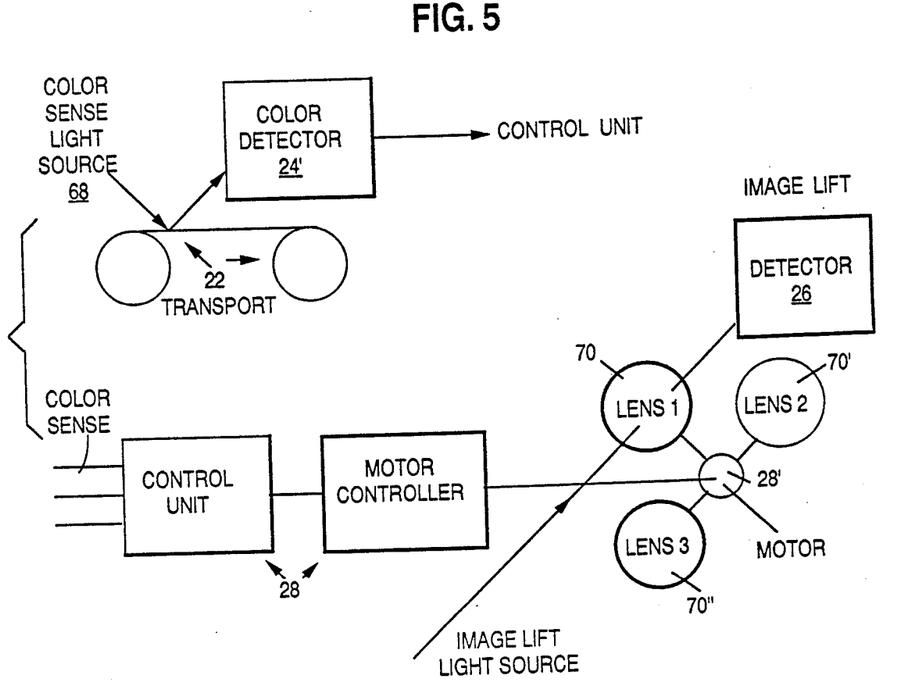
FIG. 5 is a schematic diagram of an alternate embodiment of the invention in which indicia corresponding to a document will control the placement of filters for lenses in front of the image capture camera for the document.

An example of lens control for the front camera 26 is shown in FIG. 5. The transport 22 will transport the document 25 under a color sense light source 68 which will illuminate the document with an appropriate wavelength light so that light reflected from the document is detected by the color detector 24'. Color detector 24' can be an alternate form for the indicium detector 24 shown in FIG. 1. The signal from the color detector 24' will then be passed through the scanner/image acquisition unit 18 to the CPU 14 which has accessed the camera control program 62. The camera control program 62 will then adaptively control the lens or filter control 28 through the acquisition unit 18, to thereby actuate the motor controller 28 moving one of the three lenses 70, 70' or 70'' in front of the camera 26. The appropriate lens or color filter having been moved in front of the camera 26 in response to the document type 25, will allow a maximum contrast to be presented to the camera 26 in the subsequent document image capture step 98 of the flow diagram of FIG. 7. The flow diagram of FIG. 7 then continues with step 80 and the subsequent steps as shown in FIG. 4.

Turning now to some examples of the application of the invention, consider the processing of an insurance loss claim.

EXAMPLE 1

In general, the company can control the form of the input document 25 by requiring claims adjusters to use a standard form with well-defined locations and fields for information. The type of form may vary depending on the line of business, e.g., automobile, household goods, or personal articles of high value.

However, the characterizing indicia 42 can be set as a standard. When this is read, it can call the appropriate templates 48 and table values 50 for subsequent processing.

With reference to FIG. 2b, consider the following scenario. The input device 26 lifts the image and sends it to the recognition program 54. If it is a type B it recognizes this as an automobile claim and knows where to look for information and how to process it. Based on the ID 42 it selects the templates 48 shown in FIG. 3a and the associated parameters 50.

The example illustrates that one field is text 46' and the other pictorial 44. This determines subsequent processing. For example the text field 46 would contain information on the driver, the cost of the damage, and the policy number. This data will be used to update policy information and rates in addition to handling the claim. Since it is text, it can be compressed using a standard text oriented compression algorithm C2. The picture data on the other hand will be handled by a different algorithm Cl, since it is gray scale. The appropriate compression is used to minimize the record size for storage and transmission.

The indicium 42 for subsequent processing could also be obtained from a separate control card on the transport 22 depending on how the office operates. If all of one document type go to a certain place this may be a more efficient method of operating.

A type A document as shown in FIG. 2a, may be, for example, a claim for high risk personal effects, where the pictorial information 46 may be in a different location. This may, in fact, not be a picture, but could also be an image of the last appraisal of the item and would require a higher resolution than the rest of the document to get an accurate verification of the appraiser's signature.

The system could also do a recognition of the entire document and then search the data for a field that has the requisite code that indicates what the indicium 42 is, i.e., the location of the indicium is not known a priori.

The pictorial data 46 shown in the type A document of FIG. 2a, may have underlying scroll work on the form, to discourage counterfeiting, and is no longer needed in the processing. In this case, the data in that field could be processed by a digital low pass filter to suppress the scroll work background prior to compression. Data compression of the filtered data would increase. Also, the indicium 42 could be used to set the threshold of an analog or digital device on camera 26 and the number of bits used to represent the image, to decrease the record size.

The indicia 42 could also be used to select a transfer function or a dithering mask from the stored filtering algorithms 64 to decrease the amount of data required to represent the picture.

EXAMPLE 2

In the processing of stock certificates, it is desirable in many cases, to decrease the compressed image size. This can be done by enhancing the contrast of the image and thresholding before compression. FIG. 5 illustrates the input mechanism, in which a color sensor 24' can be used to detect the color of the document. Based on this input, a filter 70 can be selected in the optical path of camera 26 to enhance the contrast. The data is thresholded and compressed. The compressed image size is decreased because the document background has been suppressed by the color filtering thresholding. The selection of the filter 70 is made prior to the lifting of the image by camera 26. The correct filter 70 can be chosen on the basis of the color sensor 24' or alternately, it can be selected based on a value associated with an indicium 42 on the stock certificate.

The diagram of FIG. 5 illustrates a physical movement of filters 70, 70', and 70'', but other methods can be used including the use of an electro-optical material whose light transmission can be altered by means of an electric or magnetic field.

The indicium 42 can be part of the document, or indicated by a separate control card prior to processing a batch of the same type of documents.

EXAMPLE 3

Figure 6A:
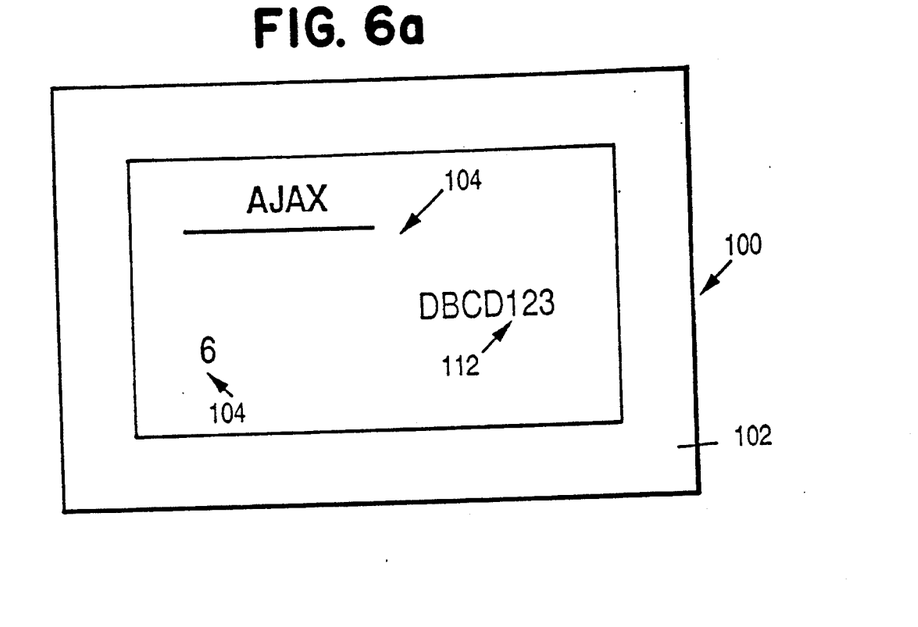
Figure 6B:
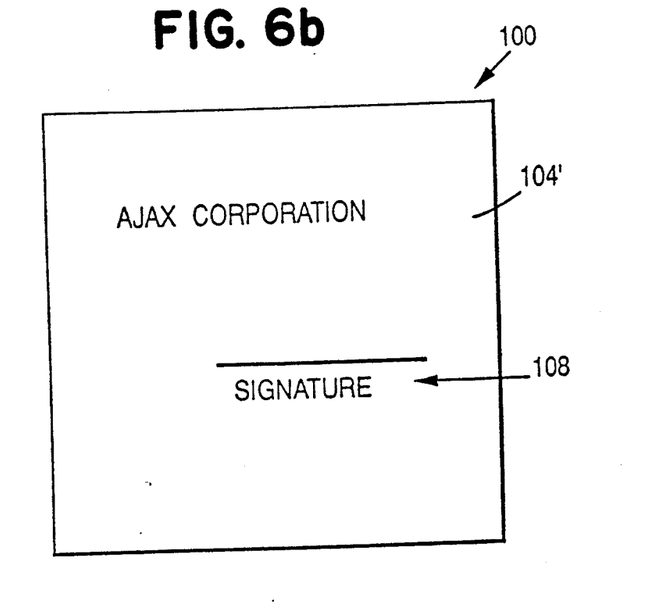

FIGS. 6a and 6b illustrate the front and back, respectively of a stock certificate. In this case, a corporation has control over the appearance of its shares and can determine where the indicium 42 is to be placed.

The certificates 100 will be scanned and the indicium 42 recognized. This may be a two stage recognition lift by detector 24 and image lift by camera 26 or a single stage lift of both by camera 26. Assume for this example that the data for recognition as well as the images of both sides of the document are available in buffers 52.

Based on the lookup table values 50 associated with the indicium 42, processing will proceed as follows.

As shown in FIG. 6a, the information on the front of a certificate is normally presented in a horizontal fashion. That is, the printed information 104 is displayed in rows parallel to the long edge of the document 100. The back side in FIG. 6b has the information 104' displayed parallel to the short edge. Therefore, in most cases, depending on the table values 50, the back side information 104 will be rotated 90 degrees prior to being sent to the compression algorithm 64. This significantly decreases the image record size, because the compression is extremely inefficient if applied in the direction perpendicular to the row direction as there are too many transitions and long run lengths are not attainable.

If a separate recognition lift of indicium 42 with detector 24 is used, from the image lift camera 26, the index 42 could also be used to decide if both sides, one side or neither side image is to be captured. The no side option is most likely if the share being processed is not in the correct batch or sequence. If a single recognition and image lift is made by camera 26, the same decision process is used, but in this case, the action is not to store the image in permanent storage.

The processing of the document 100 can be aborted based on the indicium 42, because a certificate is out of sequence. That is while processing AJAX shares, a share of ACME is inserted into the input incorrectly. In this case, the incorrect share will be sent to a different output hopper on transport 22. Also, in some cases, it may not be necessary to capture, or store both sides of the document 100. Based on the indicium 42, it may be decided that only the front side of the certificate 100 is scanned, as the endorsement information is not required for the application.

As part of the original capture of the document and based on the indicium 42, special routing information can be placed in the output record 110, to allow the information to be automatically routed to a work queue for further examination. This queue could be local or remote, for example certain stock images may be automatically routed to the transfer agent as part of the processing, or may be routed to a research assistant in the same complex. This header 112 information can be used in real time during processing of the document 100 or may be used during subsequent retrievals of the document image file 110 from storage.

Also, based on the tables 50 called by the indicium 42, and the indicium itself, a unique key can be generated for each image and placed in the image header 112 and another coded data base which can be used to retrieve the document image file 110. These header fields 112 are illustrated in FIG. 8.

The resulting adaptive image processing system and method provides an improved image handling capability for documents having pictorial and text image components, having a different information density or characteristics.

It will be understood by those having skill in the art that minor changes can be made to the specific embodiments disclosed herein, without departing from the spirit and the scope of the invention.

What is claimed is:

1. In a system for capturing an image of a document having a characterizing indicium associated therewith, a method for adaptively processing the image of the document, comprising the steps of:
    storing in said system a plurality of document templates, each defining locations of first type and second type information blocks on a corresponding one of a plurality of document types, and accessible by an indicium value;
    storing in said system a table relating said first type information block to first type processing parameters and said second type information block to second type processing parameters;
    capturing an image of a document and storing said image in an image buffer;
    recognizing a characterizing indicium associated with said document;
    accessing one of said plurality of document templates in response to a value of said recognized characterizing indicium;
    selectively accessing a first type block of information from said image of said document in said image buffer, at a location defined by said accessed document template;
    selectively accessing said first type processing parameters from said table corresponding to said first type information block;
    processing said information from said first type block using said first type processing parameters;
    whereby the image of the document is adaptively processed.

2. The method of claim 1 which further comprises the steps of: selectively accessing a second type block of information from said image of said document in said image buffer, at a location defined by said accessed document template;
    selectively accessing said second type processing parameters from said table corresponding to said second type information block;
    processing said information from said second type block using said second type processing parameters.

3. The method of claim 2 wherein said first type information block contains pictorial information and said second type information block contains text information.

4. The method of claim 3 wherein said processing of said pictorial information from said first type block produces a first type data compression of said pictorial information and said processing of said text information from said second type block produces a second type data compression of said text information.

5. The method of claim 1 wherein said characterizing indicium is read from a control card associated with said document.

6. The method of claim 1 wherein said characterizing indicium resides on said document.

7. The method of claim 6 wherein said indicium has an arbitrary location on said document.

8. The method of claim 7 wherein said indicium is located at a predetermined location on said document.

9. The method of claim 1 wherein said processing of said information from said first type block includes digitally filtering said information from said first type block.

10. The method of claim 1 wherein said processing of said information from said first type block includes analog filtering of said first type information in said first type block.

11. The method of claim 1 wherein said processing of said information from said first type block includes employing threshold discrimination to said first type image in said first type block.

12. The method of claim 1 wherein said processing of said information from said first type block includes the application of a transfer function to said first type information in said first type block.

13. The method of claim 1 wherein said processing of said information from said first type block includes the application of a dithering mask to said first type information in said first type block.

14. The method of claim 1 wherein said processing of said information from said first type block includes the compression of said first type information in said first type block.

15. In a system for capturing an image of a document having a characterizing indicium associated therewith, a method for adaptively processing the image of the document, comprising the steps of:
    storing in said system a table relating values of said characterizing indicium to processing parameters corresponding to one of a plurality of document types, and accessible by an indicium value;
    capturing an image of a document and storing said document in an image buffer;
    recognizing a characterizing indicium associated with said document;
    accessing said processing parameters for one of said plurality of document types in response to a value of said recognized characterizing indicium;

processing said document image using said accessed processing parameters; whereby the image of a document is adaptively processed.

16. The method of claim 15 wherein said processing of said document includes selectively capturing the image on both sides of said document, in response to said characterizing indicium.

17. The method of claim 15 wherein said document image is selectively rotated through a reorientation angle in response to said characterizing indicium.

18. The method of claim 15 wherein said processing is aborted in response to said characterizing indicium.

19. The method of claim 15 wherein said document image is transmitted to a destination location over a communications link in response to said characterizing indicium.

20. The method of claim 15 wherein said processing of said document includes the selective capturing of an image of a document on one side or two sides of said document.

21. The method of claim 15 wherein said processing includes the transport of said document into a designated receptacle in response to said characterizing indicium.

22. The method of claim 15 wherein said processing includes storage of said document image in a data base organized with an inverted file index whose indexing term is formulated by said characterizing indicium.

23. In a system for capturing an image of a document having a characterizing indicium associated therewith, a method for adaptively processing the image of the document, comprising the steps of:

storing in said system a table relating values of said characterizing indicium to processing parameters corresponding to one of a plurality of document types;

reading said characterizing indicium associated with said document;

sensing the color of said document;

accessing said processing parameters corresponding to said characterizing indicium and selecting a physical filter corresponding to said sensed color;

capturing an image of said document, modified by said physical filter, and storing said modified image in an image buffer;

whereby the image of said document is adaptively processed.

24. In a system for capturing an image of a document having a characterizing indicium associated therewith, a method for adaptively processing the image of the document, comprising the step of:

storing in said system a table relating values of said characterizing indicium to processing parameters corresponding to one of a plurality of document types;

reading said characterizing indicium associated with said document;

capturing an image of said document, modified by a physical filter, and storing said modified image in an image buffer;

whereby the image of said document is adaptively processed.

25. The method of claim 24 wherein said indicium is read from a control card associated with said document.

26. The method of claim 24 wherein said indicium resides on said document.

* * * * *